US012590203B2

(12) United States Patent
Sridhar et al.

(10) Patent No.: US 12,590,203 B2
(45) Date of Patent: Mar. 31, 2026

(54) CURABLE OXAMATE ESTERS AND FORMULATIONS MADE THEREFROM

(71) Applicant: Henkel AG & Co. KGaA, Duesseldorf (DE)

(72) Inventors: Laxmisha M. Sridhar, Monmouth Junction, NJ (US); Kevin J. Welch, Rocky Hill, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 737 days.

(21) Appl. No.: 17/986,273

(22) Filed: Nov. 14, 2022

(65) Prior Publication Data

US 2023/0242738 A1 Aug. 3, 2023

Related U.S. Application Data

(63) Continuation of application No. PCT/US2021/031902, filed on May 12, 2021.

(60) Provisional application No. 63/023,709, filed on May 12, 2020.

(51) Int. Cl.
*C08K 5/17* (2006.01)
*C08G 77/26* (2006.01)

(52) U.S. Cl.
CPC .............. *C08K 5/175* (2013.01); *C08G 77/26* (2013.01); *C08G 2170/00* (2013.01); *C08G 2190/00* (2013.01)

(58) Field of Classification Search
None
See application file for complete search history.

(56) References Cited

U.S. PATENT DOCUMENTS

| | | | | |
|---|---|---|---|---|
| 5,720,418 | A * | 2/1998 | Timmerman | B05C 17/00553 222/391 |
| 2005/0137357 | A1* | 6/2005 | Skoglund | B32B 27/365 525/423 |
| 2011/0130518 | A1* | 6/2011 | Gorodisher | C07C 233/56 525/119 |
| 2013/0011673 | A1* | 1/2013 | Hansen | C08G 77/452 528/33 |
| 2020/0317868 | A1* | 10/2020 | Schaefer | C07F 7/188 |

FOREIGN PATENT DOCUMENTS

| | | | | |
|---|---|---|---|---|
| EP | 0245559 A2 * | 11/1987 | | C08G 59/68 |
| WO | WO-2019120484 A1 * | 6/2019 | | C08G 77/26 |

OTHER PUBLICATIONS

Zhu, et al. How to prepare reproducible, homogeneous, and hydrolytically stable aminosilane-derived layers on silica, Langmuir, 2011, 28, 416-423 (Year: 2011).*

* cited by examiner

*Primary Examiner* — Randy P Gulakowski
*Assistant Examiner* — Audra J Destefano
(74) *Attorney, Agent, or Firm* — Steven C. Bauman

(57) ABSTRACT

The disclosure relates to oxamate esters and formulations made therefrom, and to methods of making both the oxamate esters and the formulations.

3 Claims, No Drawings

CURABLE OXAMATE ESTERS AND FORMULATIONS MADE THEREFROM

BACKGROUND

Field

The disclosure relates to oxamate esters and formulations made therefrom, and to methods of making both the oxamate esters and the formulations.

Brief Description of Related Technology

Room temperature curing resin systems are useful for many commercial applications requiring adhesive and/or sealing properties. There are several commercially available chemistry families for adhesive and sealant applications that cure at room temperature. Those families include epoxies, polyurethanes (PU), RTV silicones, anaerobics, and cyanoacrylates. Ordinarily, these adhesive or sealant products cure in the presence of atmospheric moisture, exclusion of air or coming into contact with substrate surfaces bearing a trigger for cure. With anaerobic adhesives or sealants, the lack of oxygen in the bondline of the adhesive assembly when the substrates are mated together initiates curing of the adhesive at room temperature. Or, substrates may be primed on the surface to deposit initiators or catalysts to trigger cure after application of the adhesive or sealant to the primed substrate surface. Typical surface primers include redox active reagents, which interact with a peroxide or hydroperoxide in the adhesive or sealant composition to initiate room temperature cure. As noted above there are also room temperature curing two-part epoxies, two-part PU and hydrosilylation cure silicones that are used in adhesive and sealant applications.

While room-temperature curing resin systems have many advantages, there are several disadvantages with the types of chemistries used for such resin systems. For example, PUs and silicones that cure by exposure to moisture can take several hours to several days to reach full cure. Thus, the speed and extent of cure of moisture cure systems depends on both the availability of moisture and the rate and extent of moisture permeation through the adhesive or sealant after applications. The primer-initiated curing resin systems require the additional step of applying primer to the substrate (a so-called two step resin system), which may be undesirable for many applications. For anaerobic adhesives, the thickness of the adhesive or sealant can be critical to reaching full cure, which requires careful attention to the application process.

Therefore, there is a need for a new curing system that cures quickly at room temperature without the requiring exposure to moisture or application of a primer to the surface of the substrate on which the adhesive or sealant is to be applied.

SUMMARY

The present disclosure provides a curable composition that cures within a few minutes to a few hours by reaction of oxamate esters with amines. Desirably, the curable composition is a two part or a two step composition, in which the two parts of the composition are kept separate from each other and combined at the time of use or where one part is disposed on a surface of a substrate to be bonded and the other part is either disposed over the substrate-applied one part and/or disposed on a second surface of a substrate to be bonded. In these alternatives, room temperature curing occurs to form a quick forming adhesive or sealant.

In one aspect, the present disclosure provides a curable composition comprising:

(a) an oxamate ester represented by Structure I:

Structure I

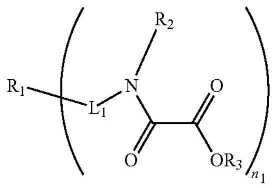

wherein $R_1$ is selected from the group consisting of a polymeric, a prepolymeric or a monomeric silicone, aliphatic, aromatic, heterocyclic, alicyclic, ether, and ester;

$L_1$ is selected from the group consisting of (1) a covalent bond, (2) a hydrocarbylene segment having 1 to 100 carbon atoms, and (3) a heterocarbylene segment having 1 to 100 carbon atoms, the latter two of which may be optionally interrupted with one or more nitrogen, oxygen or sulfur atoms;

$R_2$ is selected from the group consisting of H, alkyl, cycloalkyl, aryl, aralkyl, and heterocyclic;

$R_3$ is selected from the group consisting of alkyl, haloalkyl (such as fluoroalkyl), cycloalkyl, aryl, aralkyl, and heterocyclic; and $n_1$ is 2-20; and (b) an amine represented by Structure II:

Structure II

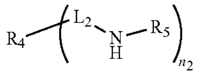

wherein $R_4$ is selected from the group consisting of a polymeric, prepolymeric or monomeric silicone, aliphatic, aromatic, heterocyclic, alicyclic, ether, and ester;

$R_5$ is selected from the group consisting of H, alkyl, cycloalkyl, aryl, aralkyl, and heterocyclic;

$L_2$ is selected from the group consisting of (1) a covalent bond, (2) a hydrocarbylene segment having 1 to 100 carbon atoms, and (3) a heterocarbylene segment having 1 to 100 carbon atoms, the latter two of which may be optionally interrupted with one or more nitrogen, oxygen or sulfur atoms; and $n_2$ is 2-20.

In another aspect, the present disclosure provides a two-part curable composition comprising:

a part A comprising an oxamate ester represented by Structure I:

Structure I

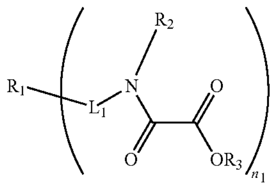

wherein $R_1$ is selected from the group consisting of a polymeric, a prepolymeric or a monomeric silicone, aliphatic, aromatic, heterocyclic, alicyclic, ether, and ester;

$L_1$ is selected from the group consisting of (1) a covalent bond, (2) a hydrocarbylene segment having 1 to 100 carbon atoms, and (3) a heterocarbylene segment having 1 to 100 carbon atoms, the latter two of which may be optionally interrupted with one or more nitrogen, oxygen or sulfur atoms;

$R_2$ is selected from the group consisting of H, alkyl, cycloalkyl, aryl, aralkyl, and heterocyclic;

$R_3$ is selected from the group consisting of alkyl, haloalkyl (such as fluoroalkyl), cycloalkyl, aryl, aralkyl, and heterocyclic; and $n_1$ is 2-20; and a part B comprising an amine represented by Structure II:

Structure II

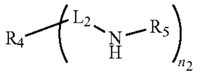

wherein $R_4$ is selected from the group consisting of a polymeric, prepolymeric or monomeric silicone, aliphatic, aromatic, heterocyclic, alicyclic, ether, and ester;

$R_5$ is selected from the group consisting of H, alkyl, cycloalkyl, aryl, aralkyl, and heterocyclic;

$L_2$ is selected from the group consisting of (1) a covalent bond, (2) a hydrocarbylene segment having 1 to 100 carbon atoms, and (3) a heterocarbylene segment having 1 to 100 carbon atoms, the latter two of which may be optionally interrupted with one or more nitrogen, oxygen or sulfur atoms; and $n_2$ is 2-20.

In this aspect, the first part and the second part of the two-part composition are kept separate from one another and combined at the time of use.

In still another aspect of the present disclosure, a method is provided of making an oxamate ester represented by Structure I, wherein $R_1$, $R_2$, $R_3$, $L_1$, and $n_1$ are as defined above, which comprises mixing about an equimolar ratio of an amine represented by Structure II, wherein $R_4$, $R_5$, $L_2$, and $n_2$ are as described above, and an oxalate ester represented by Structure VI:

Structure VI

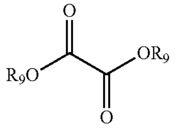

wherein $R_9$ is selected from alkyl, haloalkyl (such as fluoroalkyl), branched alkyl, cycloalkyl, branched cycloalkyl, aryl, aralkyl, heterocyclic, and heteroaromatic, in a solvent at a temperature range of −40° C. to 35° C. for a period of 30 minutes to 7 days, and evaporating the solvent and alcohol byproduct formed at reduced pressure.

In yet another embodiment according to the present disclosure, a container having two chambers is provided, one chamber containing the oxamate ester represented by Structure I and the other chamber containing the amine represented by Structure II, the container being configured to keep the oxamate ester of Structure I and the amine of Structure II separate from one another during storage but configured to permit mixing of the oxamate ester of Structure I and the amine of Structure II at the time of use thereof.

DETAILED DESCRIPTION

In one aspect, as noted above the present disclosure provides a curable composition comprising:

(a) an oxamate ester represented by Structure I:

Structure I

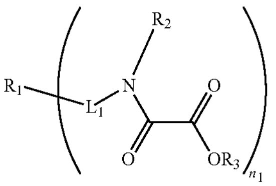

wherein $R_1$ is selected from the group consisting of a polymeric, a prepolymeric or a monomeric silicone, aliphatic, aromatic, heterocyclic, alicyclic, ether, and ester;

$L_1$ is selected from the group consisting of (1) a covalent bond, (2) a hydrocarbylene segment having 1 to 100 carbon atoms, and (3) a heterocarbylene segment having 1 to 100 carbon atoms, the latter two of which may be optionally interrupted with one or more nitrogen, oxygen or sulfur atoms;

$R_2$ is selected from the group consisting of H, alkyl, cycloalkyl, aryl, aralkyl, and heterocyclic;

$R_3$ is selected from the group consisting of alkyl, haloalkyl (such as fluoroalkyl), cycloalkyl, aryl, aralkyl, and heterocyclic; and $n_1$ is 2-20; and (b) an amine represented by Structure II:

Structure II

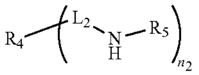

wherein $R_4$ is selected from the group consisting of a polymeric, prepolymeric or monomeric silicone, aliphatic, aromatic, heterocyclic, alicyclic, ether, and ester;

$R_5$ is selected from the group consisting of H, alkyl, cycloalkyl, aryl, aralkyl, and heterocyclic;

$L_2$ is selected from the group consisting of (1) a covalent bond, (2) a hydrocarbylene segment having 1 to 100 carbon atoms, and (3) a heterocarbylene segment having 1 to 100 carbon atoms, the latter two of which may be optionally interrupted with one or more nitrogen, oxygen or sulfur atoms; and $n_2$ is 2-20.

In another aspect, as noted above the present disclosure provides a two-part curable composition comprising:

a part A comprising an oxamate ester represented by Structure I:

Structure I

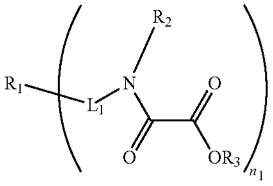

wherein $R_1$ is selected from the group consisting of a polymeric, a prepolymeric or a monomeric silicone, aliphatic, aromatic, heterocyclic, alicyclic, ether, and ester;

$L_1$ is selected from the group consisting of (1) a covalent bond, (2) a hydrocarbylene segment having 1 to 100 carbon atoms, and (3) a heterocarbylene segment having 1 to 100 carbon atoms, the latter two of which may be optionally interrupted with one or more nitrogen, oxygen or sulfur atoms;

$R_2$ is selected from the group consisting of H, alkyl, cycloalkyl, aryl, aralkyl, and heterocyclic;

$R_3$ is selected from the group consisting of alkyl, haloalkyl (such as fluoroalkyl), cycloalkyl, aryl, aralkyl, and heterocyclic; and $n_1$ is 2-20; and a part B comprising an amine represented by Structure II:

Structure II

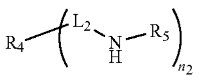

wherein $R_4$ is selected from the group consisting of a polymeric, prepolymeric or monomeric silicone, aliphatic, aromatic, heterocyclic, alicyclic, ether, and ester;

$R_5$ is selected from the group consisting of H, alkyl, cycloalkyl, aryl, aralkyl, and heterocyclic;

$L_2$ is selected from the group consisting of (1) a covalent bond, (2) a hydrocarbylene segment having 1 to 100 carbon atoms, and (3) a heterocarbylene segment having 1 to 100 carbon atoms, the latter two of which may be optionally interrupted with one or more nitrogen, oxygen or sulfur atoms; and $n_2$ is 2-20.

Here, $L_1$ may be selected from the group consisting of linear or branched alkylenes, cycloalkylenes, bicycloalkylenes, linear or branched alkenylenes, arylenes, aralkylenes, biphenylene, bisphenylenes, polyoxyalkylenes, polyoxyalkenylenes, and mixtures thereof. For instance, $L_1$ may be selected from the group consisting of alkylene, cycloalkylene, and polyether. Desirably, $L_1$ is a propylene.

$L_2$ may be selected from the group consisting of linear or branched alkylenes, cycloalkylenes, bicycloalkylenes, linear or branched alkenylenes, arylenes, aralkylenes, biphenylene, bisphenylenes, polyoxyalkylenes, polyoxyalkenylenes, and mixtures thereof. For instance, $L_2$ may be selected from the group consisting of alkylene, cycloalkylene, and polyether.

Referring back to Structure 1, $R_1$ may be a polydimethylsiloxane or a polyether. Similarly, for Structure II, $R_4$ may be a polydimethylsiloxane or a polyether too. However, $R_1$ and $R_4$ are independent of one another.

The polydimethylsiloxane may be an amine functional polydimethylsiloxane called GP-6, available commercially from Genesee Polymers, Inc., or an amine functional silicone called KF-864, or an amine functional polydimethylsiloxane called KF-865, each available commercially from Shin-Etsu Chemical Co., Ltd., Japan. Examples of amine functional and polyamine functional silicones that can be used herein include KF864, KF865, KF868, KF861, KF869, KF8021, KF867, KF8005, KF8002, KF8004, KF880, KF863, KF393, KF859, X22-3939A, KF877, KF889 that are available from Shin Etsu; GP-6, GP-4, GP581, GP988-1, GP344, GP997, GP316, GP342, GP967, GP965, GP966, and GP654 that are available from Genesee Polymers; Silamine AOEDA, Silarnine D2 EDA, Silamine DG-50, Silamine Di-AEAP, Silamine MUE, Silamine STD-50, Silamine STD-100, Silamine T-SA, Silamine T-97, Silamine 2972, Silamine 3372, Silamine AS, Silamine C-50, Silamine C-100, Silamine C-300, Silamine D208-EDA, and Silamine PD that are available from Siltech Corporation; L656 and BELSIL® ADM 1370 from Wacker Corporation; and APS327 and APS328 from Advanced Polymer Inc. See www.gpgsilicones.com/products/silicone-fluids/amine-functional; www.siltech.com/products/silicone-amines-silamine/; and www.shinetsusilicone-global.com/catalog/pdf/modified_e.pdf The polyether may be a commercially available one, such as one sold under the tradename JEFFAMINE by Huntsman Corporation, Houston, TX. Many of the polyethers are amine-functionalized polyethers, such as JEFFAMINE D-230, JEFFAMINE D-400, JEFFAMINE D-2000, JEFFAMINE T-403, JEFFAMINE ED-600, JEFFAMINE ED-900, JEFFAMINE ED-2001, JEFFAMINE EDR-148, JEFFAMINE XTJ-509, JEFFAMINE T-3000, JEFFAMINE T-5000, and combinations thereof.

The JEFFAMINE D series are diamine based products and may be represented by

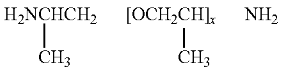

(CAS Registry No. 904610-0)

where x is about 2.6 (for JEFFAMINE D-230), 5.6 (for JEFFAMINE D-400) and 33.1 (for JEFFAMINE D-2000), respectively.

The JEFFAMINE T series are trifunctional amine products based on propylene oxide and may be represented by

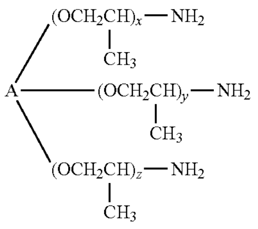

where x, y and z are set forth below in Table A.

TABLE A

| | JEFFAMINE | Approx. Mol. Wt | Mole PO |
|---|---|---|---|
| T-403 | Trimethylolpropane | 440 | 5-6 |
| T-3000 | Glycerine | 3,000 | 50 |
| T-5000 | Glycerine | 5,000 | 85 |

More specifically, the JEFFAMINE T-403 product is a trifunctional amine and may be represented by

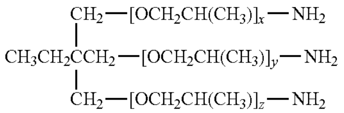

amino functional silanes may be present in at least one of part A or part B. In this case, the inventive compositions add the feature of moisture curability which may be enhanced with the addition of a moisture cure catalyst. Moisture curability is triggered through exposure to atmospheric moisture or exposure to elevated humidity conditions, for instance. Suitable moisture cure catalysts include tin and platinum compounds or complexes.

When used, the amino functional silane should be used in an amount of about 0.1 to about 20 percent by weight.

In addition, the curable composition may further comprise a UV curable component and a photoinitiator, particularly in the two part configuration of the present disclosure.

The UV curable component may be represented by Structures III to V:

Structure III

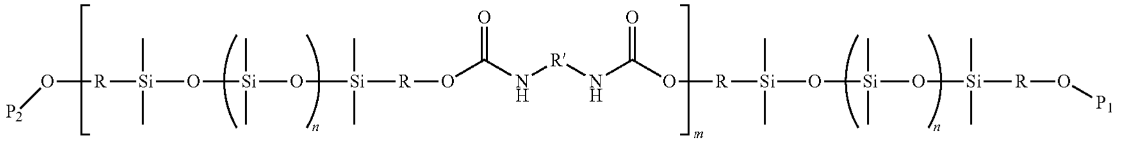

where x+y+z is 5.3 (CAS Registry No. 39423-51-3).

The JEFFAMINE ED series are polyether diamine-based products and may be represented by

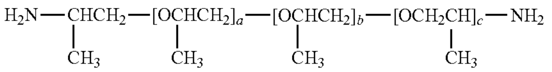

where a, b and c are set forth below in Table B.

TABLE B

| JEFFAMINE | Approx. Value b | a + c | Approx. Mol. Wt |
|---|---|---|---|
| ED-600 | 8.5 | 2.5 | 600 |
| ED-900 | 15.5 | 2.5 | 900 |
| ED-2001 | 40.5 | 2.5 | 2,000 |

The amine in part B may be a diamine or polyamine. For instance, the amine-functionalized polyethers referred to above are desirable choices. In addition, other polyamines such as Primine 1074 from Croda, polyfunctional aliphatic amines, cycloaliphatic diamines or polyamines (hydrogenation products of aromatic diamines or polyamines) may likewise be used.

The oxamate ester should be used in an amount of about 20 to about 80 molar %.

The amine should be used in an amount of about 80 to about 20 molar %.

The curable composition may further comprise an amino functional silane, such as an amino functional trialkoxysilane (such as methoxy, ethoxy or propoxy, or combinations thereof) or amino functional triacetoxysilane. The addition of such amino functional silanes is particularly useful in the two part configuration of the present disclosure, where the wherein here R and R' are each independently selected from the group consisting of a hydrocarbylene segment having 1 to 30 carbon atoms and a heterocarbylene segment having 1 to 30 carbon atoms, each of which may be optionally interrupted by one or more of nitrogen, oxygen or sulfur atoms;

$P_1$ and $P_2$ are each independently selected from the group consisting of H and a polymerizable group derived from reaction of a compound bearing a hydroxyl group and a compound bearing both an isocyanate group and a (meth)acrylate group, provided that only one of $P_1$ and $P_2$ can be H; and n and m are each independently 1-10,000;

Structure IV

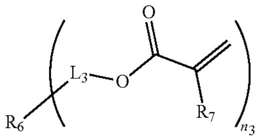

wherein here $R_6$ is selected from the group consisting of a polymeric, prepolymeric or monomeric silicone, aliphatic, aromatic, heterocyclic, alicyclic, ether, ester, or urethane;

$L_3$ is selected from the group consisting of a covalent bond, a hydrocarbylene segment having 1 to 100 carbon atoms, and a heterocarbylene segment having 1 to 100 carbon atoms, each of which may optionally be interrupted by one or more nitrogen, oxygen, or sulfur atoms;

$R_7$ is H or methyl; and $n_3$ is 1-20; or

Structure V

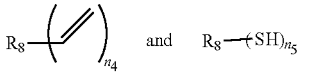

wherein here $R_8$ is independently selected from the group consisting of a polymeric, prepolymeric or monomeric silicone, aliphatic, aromatic, heterocyclic, alicyclic, ether, ester, or urethane; and $n_4$ and $n_5$ are each independently 2-20.

Examples of the UV curable component represented by any one of Structures II-V include silicone-organic hybrid acrylates as described in International Patent Publication Nos. WO 2019104317 and WO 2019104310; monofunctional and multifunctional silicone acrylates such as Silmer ACR D208, ACR Di-50, ACR Di-1508, ACR Di-2510, ACR Di 4515-O, ACR Di-10 supplied by Siltech Corporation; X-22-164, X-22-164A, X-22-164AS, X-22-164B, X-22-164C, X-22-164E, X-22-174ASX, X-22-174BX, KF2012, X-22-2426, X-22-2404 supplied by Shin Etsu; and several silicone acrylates sold by Gelest. The vinyl functional resins that can be used in thiol-ene UV curing include mercaptan functional silicones such as GP-367, GP-71SS, GP-800, GP-710 that are available from Genesee Polymers; KF2001, KF2004, X-22-167B, X-22167C mercaptan functional silicones that are available from Shin Etsu; other mercaptan functionalized silicone available from Gelest Inc; Silmer SH J10, Silmer SH Q20, and Silmer SH Q208-30 mercapto functional silicones that are available from Siltech Corporation; mercaptoacetate and mercaptopropionates of pentaerythritol and trimethylolpropane and other mercapto functional monomers available from Showa Denko.

The vinyl functional monomers and polymers that can be used in the invention include vinyl functional silicones such as those available from Gelest Inc; Silmer VIN C50, VIN J10, VIN 70, VIN 100, VIN 500, VIN 1000, VIN 5000, VIN 10,000, VIN20000, and VIN60,000 that are available from Siltech Corporation; vinyl functional silicone modifiers 705, 715 that are available from Evonik Corporation; GP-977, GP-907 and GP-908 that are available from Genesee Polymers; grades of Andisil® Vinyl Polymers that are available from AB specialty silicones; vinyl and allyl functional polymers such as polybutadiene, polyisoprene and their block copolymers and terpolymers; diallyl ethers and multifunctional allyl ethers of pentaerythritol, trimethylolpropane and other aliphatic and cycloaliphatic polyols.

When used the UV curable component should be used in an amount of about 10 to about 80 percent by weight of the total composition.

As regards Structure V, the ene and thiol compounds may be chosen from any of the well known compounds used in the thiol-ene reaction, such as those well known and described in the art. For instance, reference may be had to International Patent Publication No. WO 2006055409 and European Patent Document No. EP 0338616 for illustrative choices of these compounds.

The two-part curable composition should be configured such that the part A and the part B are kept separate from one another until the composition is to be used. In this manner, the two-part curable composition may be housed in a container comprising two chambers, one chamber enclosing part A of the two-part curable composition and the other chamber enclosing part B of a two-part curable composition, the container being configured to keep the contents of the two chambers separate during storage but configured to permit mixing of the two parts at the time of use of the room temperature curable composition.

In one embodiment, Structure I of part A comprises an oxamate ester represented by Structure VII:

Structure VII

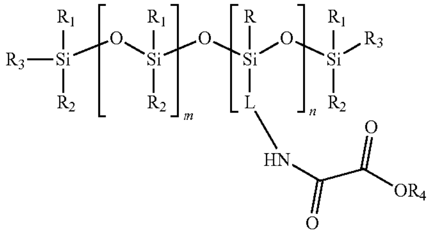

wherein R, $R_1$, $R_2$, $R_3$ and $R_4$ are each independently selected from the group consisting of alkyl, aryl, or aralkyl;

L is alkylene, with or without interruption by one or more O atoms; and n is greater than or equal to 2 and m is 2-1,000.

In another aspect, the present disclosure provides a compound represented by Structure I:

Structure I

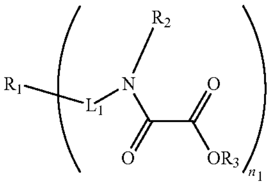

wherein $R_1$ is selected from the group consisting of a polymeric or a prepolymeric silicone, aliphatic, aromatic, heterocyclic, alicyclic, ether, or ester;

$L_1$ is selected from the group consisting of (1) a covalent bond, (2) a hydrocarbylene segment having 1 to 100 carbon atoms, or (3) a heterocarbylene segment having 1 to 100 carbon atoms, the latter two of which may be optionally interrupted with one or more nitrogen, oxygen or sulfur atoms;

$R_2$ is selected from the group consisting of H, alkyl, cycloalkyl, aryl, aralkyl, and heterocyclic;

$R_3$ is selected from the group consisting of alkyl, haloalkyl (such as fluoro alkyl), cycloalkyl, aryl, aralkyl, and heterocyclic; and $n_1$ is 2-20, provided that $L_1$ does not attach to $R_1$ of the polymer or the prepolymer at its terminus.

In another embodiment, the present disclosure provides a compound, useful in the inventive curable composition, represented by Structure VII:

Structure VII

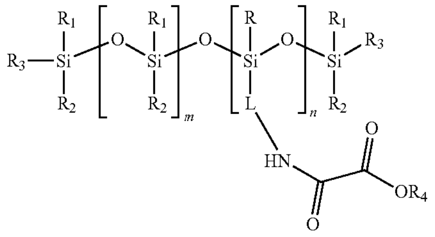

wherein R, $R_1$, $R_2$, $R_3$ and $R_4$ are each independently selected from the group consisting of alkyl, aryl, and aralkyl;

L is alkylene, with or without interruption by one or more O atoms; and n is greater than or equal to 2 and m is 2-1,000.

In another aspect of the present disclosure, a method is provided of making an oxamate ester represented by Structure I, wherein $R_1$, $R_2$, $R_3$, $L_1$, and $n_1$ are as defined above. The method involves the steps of mixing about an equimolar ratio of an amine represented by Structure II and an oxalate ester represented by Structure VI (shown below) in a solvent at a temperature range of about −40° C. to about 35° C. for a period of about 3 minutes to about 7 days, and evaporating the solvent and alcohol byproduct formed at reduced pressure.

Structure VI

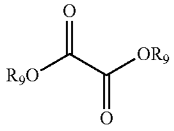

wherein $R_9$ is selected from alkyl, branched alkyl, cycloalkyl, branched cycloalkyl, aryl, aralkyl, heterocyclic, and heteroaromatic.

The oxamate esters may be made by the selective condensation reaction between multifunctional amines and diethyl oxalate under controlled conditions as described above. Until now, known synthetic methods for oxamate esters (for linear polymers or block copolymers) used excess amount of dialkyl oxalate and the reaction was performed in the presence of metal catalyst and at elevated temperatures.

Oxamate esters within Structure I as shown below may be made in this manner:

Structure I

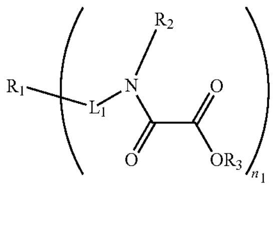

wherein $R_1$, $L_1$, $R_2$, $R_3$ and $n_1$ are as defined above, and the same proviso applies.

Likewise, oxamate esters within Structure VII below may be made in this manner too:

Structure VII

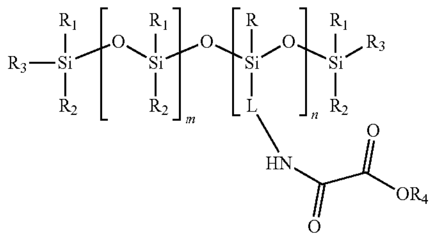

wherein R, $R_1$, $R_2$, $R_3$, $R_4$, L and n and m are each as defined above.

In still another aspect, the present disclosure provides a method of bonding two or more surfaces. The method includes the steps of:

- Disposing onto at least one surface of at least one substrate an oxamate ester represented by Structure I;
- Disposing onto at least one surface of at least one substrate an amine represented by Structure II; and
- Mating the surfaces of the substrates on which is disposed the oxamate ester and the amine for a time sufficient to permit the oxamate ester and the amine to react to form an adhesive or sealant.

Optionally, either or both of the oxamate ester or the amine may be dispersed or dissolved in a carrier. The carrier may be selected from liquid vehicles suitable to aid application and also evaporate after only a short period of time, oftentimes without the aid of exposure to mildly elevated temperature conditions.

The examples below provide additional details and illustration which may be useful to those persons of ordinary skill in the art who may have an interest in replicating the present disclosure.

EXAMPLES

Oxamate esters were made in a reaction that maintained about a 1:1 stoichiometric ratio of amine and diethyl oxalate under controlled conditions to obtain solely the oxamate ester, a representative example of which is as shown below.

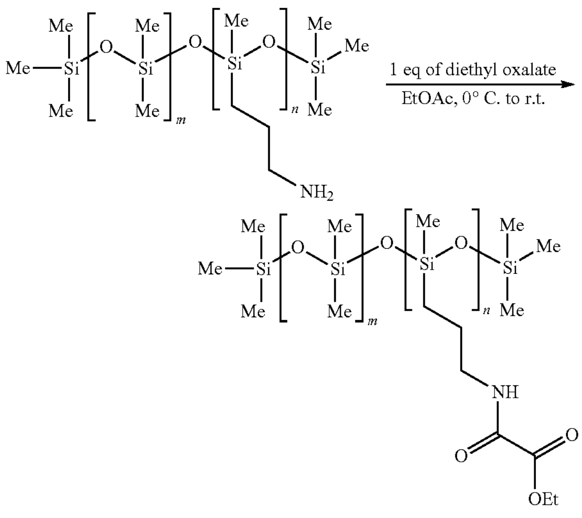

Examples 1-5 show the synthesis of several oxamate esters possessing either a polysiloxane or a polyether backbone.

Example 1: Synthesis of Oxamate Ester from Amine Functional Polydimethylsiloxane GP-6

Structure A

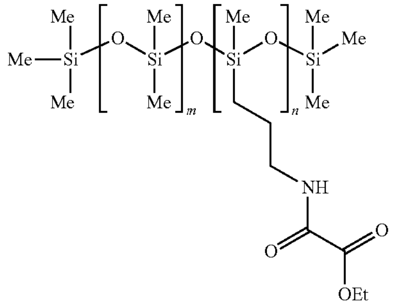

In a 500 mL 3 necked flash equipped with a mechanical stirrer and a pressure equalizing addition funnel was placed a solution of diethyl oxalate (7.27 g, 49 mmol) in ethyl acetate (100 mL). The solution was cooled to 0° C., and amine functional polydimethylsiloxane GP-6, obtained from Genesee Polymers, Burton, MI (amine EW 1931, 96.06 g, 49 mmol) was added dropwise through the pressure equalizing funnel over a period of about 45 minutes. The mixture was stirred at 0° C. for 2 h and the cooling bath was removed with further stirring for 2h as it warmed to room temperature. The solvent was evaporated under reduced pressure to give the oxamate ester, shown as Structure A, as a colorless liquid (92 g).

Example 2: Synthesis of Oxamate Ester from Amine Functional Silicone KF-864

Structure B

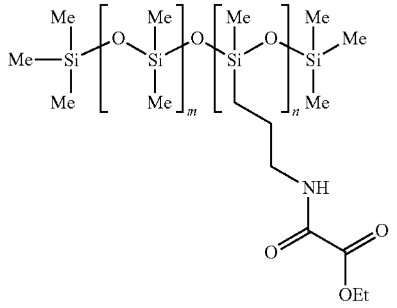

In a 500 mL 3 necked flash equipped with a mechanical stirrer and a pressure equalizing addition funnel was placed a solution of diethyl oxalate (3.64 g, 24 mmol) in ethyl acetate (30 mL). The solution was cooled to 0° C., and amine functional polydimethylsiloxane KF-864, obtained from Shin-Etsu America, Newark, CA (amine EW 3710, 92.4 g, 24 mmol) in ethyl acetate (60 mL) was added dropwise through the pressure equalizing funnel over a period of about 1 h. The mixture was stirred at 0° C. for 2 h and the cooling bath was removed with further stirring for 2 h as it warmed to room temperature. The solvent was evaporated under reduced pressure to give the oxamate ester, shown in Structure B, as a colorless liquid (90 g).

Example 3: Synthesis of Oxamate Ester from Amine Functional Polydimethylsiloxane KF-865

Structure C

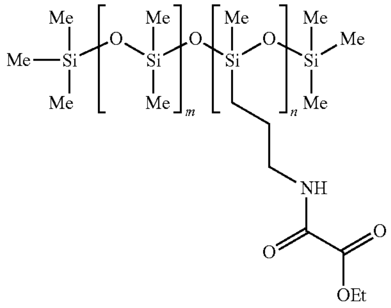

In a 500 mL 3 necked flash equipped with a mechanical stirrer and a pressure equalizing addition funnel was placed a solution of diethyl oxalate (2.58 g, 17.6 mmol) in ethyl acetate (60 mL). The solution was cooled to 0° C. with ice-water mixture, and amine functional polydimethylsiloxane KF-865, obtained from Shin-Etsu America (amine EW 5000, 88.19 g, 17.6 mmol) in ethyl acetate (20 mL) was added dropwise through the pressure equalizing funnel over a period of about 45 minutes. The mixture was stirred at 0° C. for 2 h and the cooling bath was removed with further stirring for 2h as it warmed to room temperature. The solvent was evaporated under reduced pressure to give the oxamate ester, shown in Structure C, as a colorless liquid (85.4 g).

Example 4: Synthesis of Oxamate Ester from Amine Functional PPG (Jeffamine T-5000)

Structure D

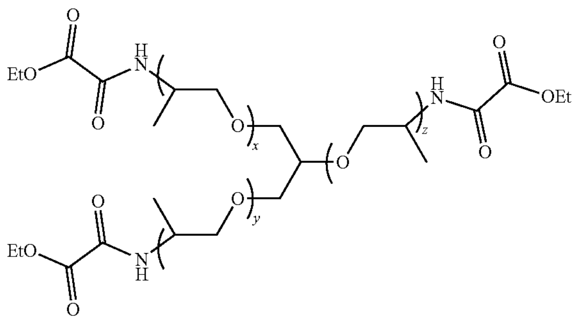

In a 1 L 3 necked flash equipped with a mechanical stirrer and a pressure equalizing addition funnel was placed a solution of diethyl oxalate (17 g, 116 mmol) in ethyl acetate (120 mL). The solution was cooled to 0° C. with ice-water mixture, and amine functional PPG, Jeffamine T-5000, obtained from Huntsman Corporation, The Woodlands, TX (amine EW 1904, 221 g, 116 mmol) in ethyl acetate (100 mL) was added dropwise through the pressure equalizing funnel over a period of about 1 h. The mixture was stirred at 0° C. for 2 h and the cooling bath was removed with further stirring for 2h as it warmed to room temperature. The solvent was evaporated under reduced pressure to give the oxamate ester, shown in Structure D, as a low viscosity liquid (231 g).

Example 5: Two-Part Curable Formulations

Formulation 1 shows a two-part curable formulation comprising the oxamate ester and amine functional polydimethylsiloxane (KF 864) in separate parts, as shown in the table below.

| Formulation 1/Amt (grams) | |
|---|---|
| Part A: Oxamate ester of Example 3 (ester EW 5100) | 7.23 |
| Part B: Amine functional PDMS (KF-864, amine EW 3710) | 5.26 |

Upon mixing Part A and Part B, Formulation 1 was observed to gel in 1h 30 minutes. Shore 00 hardness after 5h standing at room temperature was observed to be 5; after 18h standing at room temperature was observed to be 15; after 24h standing at room temperature was observed to be 20; and after 4 days standing at room temperature was observed to be 25. The gel obtained was soluble in neither toluene nor a 3:1 toluene-IPA mixture even after standing at room temperature for several days.

Formulations 2 and 3 were also formulated in a two-part configuration as above and shown in the tables below.

| Formulation 2/Amt (grams) | |
|---|---|
| Part A: Oxamate ester of Example 3 (ester EW 5100) | 3.99 |
| Part B: Amine functional PDMS (KF 880, amine EW = 1800) | 1.4 |

Upon mixing Part A and Part B, Formulation 2 was observed to gel in 30 minutes. Shore 00 hardness after 1h standing at room temperature was observed to be 5; after 16h standing at room temperature was observed to be 10; and after 4 days standing at room temperature was also observed to be 10. The gel obtained was soluble in neither toluene nor a 3:1 toluene-IPA mixture even after standing at room temperature for several days. The insolubility observation indicates that once reacted Formulation 1 had crosslinked.

| Formulation 3/Amt (grams) | |
|---|---|
| Part A: Oxamate ester of Example 3 (ester EW 5100) | 8.42 |
| Part B: Amine functional PDMS (KF 880, amine EW = 1800) | 1.41 |
| Part B: Amine functional PDMS (KF 864, amine EW = 3710) | 3.2 |

Similarly, upon mixing Part A and Part B, Formulation 3 was observed to gel in 1h. Shore 00 hardness after 2h standing at room temperature was observed to be 5; after 16h standing at room temperature was observed to be 12; after 24h standing at room temperature was observed to be 18; and after 4 days standing at room temperature was also observed to be 28. The gel obtained was soluble in neither toluene nor a 3:1 toluene-IPA mixture even after standing at room temperature for several days. The insolubility observation indicates that once reacted Formulation 1 had crosslinked.

Formulation 4 uses constituents (here, DMS-V22 vinyl terminated PDMS and thiol functional PDMS) to create the thiol-ene reaction upon exposure to UV radiation and the reaction of an oxamate ester with an amine.

| Formulation 4/Amt (grams) | |
|---|---|
| DMS-V22 vinyl terminated PDMS, vinyl EW 4700 | 7 |
| Thiol functional PDMS (GP 367, mercaptan EW 620.7) | 0.92 |
| Oxamate ester of example 3 (Ester EW 5100) | 5.37 |
| KF 864 (amine functional PDMS, amine EW 3710) | 3.9 |
| TPO photoinitiator* (0.1 wt %) | 0.00127 |
| Tinuvin 123* (0.2 wt %) | 0.0025 |

*A premix of 50% solution of TPO and Tinuvin 123 was made in ethyl acetate and added to the formulation.

The Shore 00 hardness for Formulation 4 after exposure to UV radiation emitted from a mercury vapor lamp was observed to about 15. The Shore 00 hardness was observed to keep increasing with time. For instance, the Shore 00 hardness after UV cure and standing at room temperature for 90 minutes is 20, after 24h is 28, and after 4 days is 36. This demonstrates the cure reaction by oxamate ester-amine at room temperature continues even when the UV light source is removed.

The same formulation was also not exposed to UV radiation. Consequently, no UV-initiated thiol-ene reaction occurred. The formulation was observed to form a gel upon standing at room temperature after a period of time of about 4h.

Formulation 5 was prepared using thiol-ene reaction for UV cure and oxamate ester-amine reaction for shadow cure, as shown below.

| Formulation 5/Amt (grams) | |
|---|---|
| Oxamate ester of example 3 | 5.13 |
| KF864 (amine PDMS) | 3.73 |
| X-22-167B (mercaptan functional PDMS) | 1.36 |
| VDT 131 (vinyl functional PDMS) | 8 |
| TPO | 0.0011 (0.06%) |
| Tinuvin 123 | 0.22 (0.12%) |

As in the previous case, the gradual increase in Shore hardness with time resulted from the shadow cure based on the oxamate ester-amine reaction.

The Shore 00 hardness for Formulation 5 after exposure to UV radiation was observed to be about 6. The Shore 00 hardness was observed to keep increasing with time. For instance, the Shore 00 hardness after UV cure and standing at room temperature for 4 hours is 15, after 24h is 25, and after 4 days is 36. The same formulation was also not exposed to UV radiation. Consequently, no UV-initiated thiol-ene reaction occurred. The formulation was observed to form a gel upon standing at room temperature after a period of time of about 4h.

Optical aging properties for Formulation 5 as a one part formulation are shown in the table below.

| | Aging properties (1048 h) | | | |
|---|---|---|---|---|
| Optical test Datacolor 650 | Initial | 85° C./85% RH | 105° C. | QUV |
| Haze | 0.2 | 0.7 | 0.8 | 0.6 |
| Color | 0.22 | 2.01 | 3.1 | 2.05 |
| % Transmittance | 99.65 | 99.1 | 98.7 | 99.0 |

Optical aging results for Formulation 5 as a two-part system is shown in the table below.

| | Aging properties (1144 h) | | | |
|---|---|---|---|---|
| Optical test Datacolor 650 | Initial | 85° C./ 85% RH | 105° C. | QUV |
| Haze | 0.4 | 1.0 | 0.1 | 1.4 |
| Color | 0.39 | 0.8 | 3.47 | 0.89 |
| % Transmittance (550 nm) | 99.31 | 99.39 | 98.58 | 99.41 |

The optical aging properties for Formulation 5, whether in a one part or two part format, were similar. The Shore hardness measurements were also observed to be similar.

What is claimed is:

1. A two-part curable composition comprising:

a part A comprising an oxamate ester represented by Structure I:

Structure I

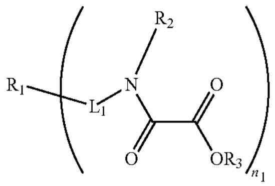

wherein $R_1$ is polydimethylsiloxane;

$L_1$ is selected from the group consisting of (1) a covalent bond, (2) a hydrocarbylene segment having 1 to 100 carbon atoms, and (3) a heterocarbylene segment having 1 to 100 carbon atoms, the latter two of which may be optionally interrupted with one or more nitrogen, oxygen or sulfur atoms;

$R_2$ is selected from the group consisting of H, alkyl, cycloalkyl, aryl, aralkyl, and heterocyclic;

$R_3$ is selected from the group consisting of alkyl, haloalkyl, cycloalkyl, aryl, aralkyl, and heterocyclic; and $n_1$ is 2-20; and a part B comprising an amine represented by Structure II:

Structure II

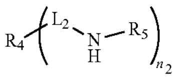

wherein $R_4$ is selected from the group consisting of a polymeric, prepolymeric or monomeric silicone, aliphatic, aromatic, heterocyclic, alicyclic, ether, and ester;

$R_5$ is selected from the group consisting of H, alkyl, cycloalkyl, aryl, aralkyl, and heterocyclic;

$L_2$ is selected from the group consisting of (1) a covalent bond (2) a hydrocarbylene segment having 1 to 100 carbon atoms and (3) a heterocarbylene segment having 1 to 100 carbon atoms, the latter two of which may be optionally interrupted with one or more nitrogen, oxygen or sulfur atoms; and $n_2$ is 2-20.

2. A two-part curable composition comprising:

a part A comprising an oxamate ester represented by Structure VII:

Structure VII

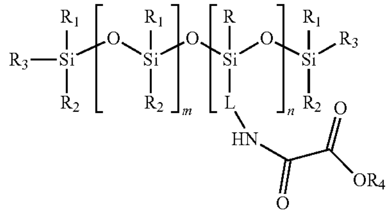

wherein R, $R_1$, $R_2$, $R_3$, and $R_4$ are each independently selected from the group consisting of alkyl, aryl, or aralkyl;

L is alkylene, with or without interruption by one or more O atoms; and n is greater than or equal to 2 and m is 2-1,000; and a part B comprising an amine represented by Structure II:

Structure II

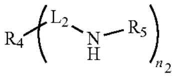

wherein $R_4$ is selected from the group consisting of a polymeric, prepolymeric or monomeric silicone, aliphatic, aromatic, heterocyclic, alicyclic, ether, and ester;

$R_5$ is selected from the group consisting of H, alkyl, cycloalkyl, aryl, aralkyl, and heterocyclic;

$L_2$ is selected from the group consisting of (1) a covalent bond, (2) a hydrocarbylene segment having 1 to 100 carbon atoms, and (3) a heterocarbylene segment having 1 to 100 carbon atoms, the latter two of which may be optionally interrupted with one or more nitrogen, oxygen or sulfur atoms; and $n_2$ is 2-20.

3. A two-part curable composition comprising:

A part A comprising an oxamate ester represented by Structure I:

Structure I

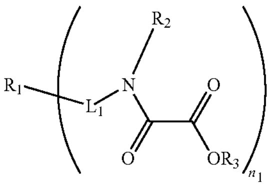

wherein $R_1$ is selected from the group consisting of a polymer or a prepolymer;

$L_1$ does not attach to $R_1$ of the polymer or the prepolymer at its terminus and is selected from the group consisting of (1) a covalent bond, (2) a hydrocarbylene segment having 1 to 100 carbon atoms, and (3) a heterocarbylene segment having 1 to 100 carbon atoms, the latter two of which may be optionally interrupted with one or more nitrogen, oxygen or sulfur atoms;

$R_2$ is selected from the group consisting of H, alkyl, cycloalkyl, aryl, aralkyl, and heterocyclic;

$R_3$ is selected from the group consisting of alkyl, haloalkyl, cycloalkyl, aryl, aralkyl, and heterocyclic; and $n_1$ is 2-20; and a part B comprising an amine represented by Structure II:

Structure II

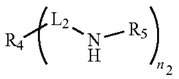

wherein $R_4$ is selected from the group consisting of a polymeric, prepolymeric or monomeric silicone, aliphatic, aromatic, heterocyclic, alicyclic, ether, and ester;

$R_5$ is selected from the group consisting of H, alkyl, cycloalkyl, aryl, aralkyl, and heterocyclic;

$L_2$ is selected from the group consisting of (1) a covalent bond, (2) a hydrocarbylene segment having 1 to 100 carbon atoms, and (3) a heterocarbylene segment having 1 to 100 carbon atoms, the latter two of which may be optionally interrupted with one or more nitrogen, oxygen or sulfur atoms; and $n_2$ is 2-20.

* * * * *